United States Patent
Koskela et al.

(10) Patent No.: US 12,363,781 B2
(45) Date of Patent: Jul. 15, 2025

(54) FAILURE RECOVERY IN CELLULAR COMMUNICATION NETWORKS

(71) Applicant: NOKIA TECHNOLOGIES OY, Espoo (FI)

(72) Inventors: Timo Koskela, Oulu (FI); Samuli Heikki Turtinen, Ii (FI); Sami-Jukka Hakola, Kempele (FI); Juha Pekka Karjalainen, Oulu (FI); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 435 days.

(21) Appl. No.: 17/927,312

(22) PCT Filed: Apr. 12, 2021

(86) PCT No.: PCT/EP2021/059423
§ 371 (c)(1),
(2) Date: Nov. 22, 2022

(87) PCT Pub. No.: WO2021/233609
PCT Pub. Date: Nov. 25, 2021

(65) Prior Publication Data
US 2023/0209634 A1    Jun. 29, 2023

Related U.S. Application Data

(60) Provisional application No. 63/029,024, filed on May 22, 2020.

(51) Int. Cl.
*H04W 76/19* (2018.01)
*H04W 36/30* (2009.01)

(52) U.S. Cl.
CPC ......... *H04W 76/19* (2018.02); *H04W 36/305* (2018.08)

(58) Field of Classification Search
CPC . H04W 76/19; H04W 36/305; H04W 74/085; H04B 7/0695
See application file for complete search history.

(56) References Cited

U.S. PATENT DOCUMENTS

| | | | |
|---|---|---|---|
| 2020/0100154 A1* | 3/2020 | Cirik | H04W 36/0072 |
| 2020/0186218 A1* | 6/2020 | Wu | H04W 72/21 |
| 2020/0389884 A1* | 12/2020 | Hakola | H04W 36/362 |
| 2021/0105765 A1* | 4/2021 | Cirik | H04W 76/18 |

FOREIGN PATENT DOCUMENTS

| | | |
|---|---|---|
| EP | 3 629 492 A1 | 4/2020 |
| EP | 3 800 802 A1 | 4/2021 |
| WO | 2021/034672 A1 | 2/2021 |

OTHER PUBLICATIONS

International Search Report issued in corresponding International Application No. PCT/EP2021/059423 on Jul. 22, 2021.

* cited by examiner

*Primary Examiner* — Habte Mered
(74) *Attorney, Agent, or Firm* — Barta Jones, PLLC

(57) ABSTRACT

According to an example aspect of the present invention, there is provided a method which includes detecting a failure. After detecting the failure, determining an association in response to identifying a new candidate beam for beam failure recovery, wherein the association is between a control resource set and at least one of a particular index and a beam failure recovery request. The method may also include transmitting a failure recovery request based on the association.

20 Claims, 3 Drawing Sheets

FAILURE RECOVERY IN CELLULAR COMMUNICATION NETWORKS

FIELD

Various example embodiments relate in general to cellular communication networks and more specifically, to failure recovery in such networks.

BACKGROUND

Future wireless networks, such as fifth generation (5G) networks are expected to support massive connectivity, high capacity, ultra-reliability and low latency. It is envisioned that multiple transmission and reception points (multi-TRPs) will have important role in order to improve reliability, coverage, and capacity performance through flexible deployment scenarios.

For example, to be able to support the exponential growth in mobile data traffic in 5G and to enhance the coverage, wireless devices are expected to access networks composed of multi-TRPs. High carrier frequencies (e.g., millimeter waves in 5G) facilitate deployment of a large number of antennas (e.g. so called massive-MIMO) at the base-station, which requires beam management procedures for multi-TRP technology.

Using more narrow transmission beams also makes a wireless system more susceptible to sudden coverage loss due to beam failure. 3rd Generation Partnership Project (3GPP) develops standards for 5G/New Radio (NR). One of the topics in 3GPP discussions is related to beam failure recovery, for which there is need for improved solutions.

SUMMARY

Some aspects of the invention are defined by the features of the independent claims. Some specific embodiments are defined in the dependent claims.

According to a first aspect, there is provided a method, comprising: detecting a failure; after detecting the failure, generating an association between a failure recovery control resource set and at least one of a particular index or a transmission or reception point, TRP; transmitting a failure recovery request; and monitoring for a response to the failure recovery request on the basis of the generated association.

There is also provided an apparatus comprising at least one processor, at least one memory including computer program code, the at least one memory and the computer program code being configured to, with the at least one processor, cause the apparatus at least to perform the method of the first aspect, or any embodiment thereof.

There is further provided an apparatus, comprising means configured for causing the apparatus at least to perform the method of the first aspect, or any embodiment thereof. The means may comprise at least one processor, and at least one memory including computer program code, the at least one memory and the computer program code being configured to, with the at least one processor, cause the performance of the apparatus.

According to still further aspects, there are provided a computer program and a computer-readable medium, or a non-transitory computer-readable medium, configured, when executed in a data processing apparatus, to perform the method of the first aspect, or an embodiment thereof.

EMBODIMENTS

Figure 1:
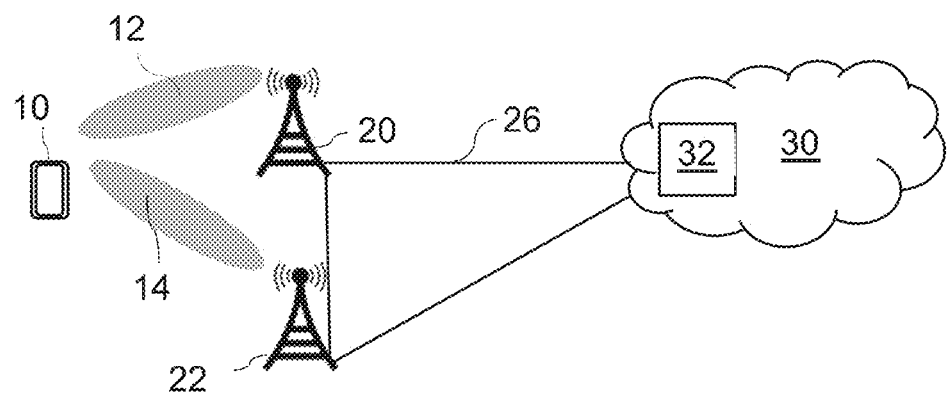
FIG. 1 illustrates an example wireless communication system, according to certain example embodiments.

FIG. 1 illustrates a simplified example system. There may be a beam-based wireless communication system, which may include user equipment (UE) 10, and one or more base stations (BSs) 20, 22. UE 10 may be connected to BS 20 via air interface using beams 12, 14, And BS 20, 22 may be a network entity that configures some or all control information of UE 10 and allocates resources for UE 10. In some example embodiments, BS 20, 22 may refer to a transmission or reception point (TRP), or may include multiple TRPs that may be co-located or non-co-located. The term TRP herein may generally refer to a point capable for transmission and/or reception, without limiting to the 3GPP NR TRP. Thus, for example FIG. 1 may demonstrate a multi-TRP scenario, if BSs 20, 22 are considered as TRPs. One or multiple beams per TRP may be used to cover a cell or provide coverage for a cell or multiple cells.

UE 10 may be referred to as a user device or wireless terminal in general. Hence, without limiting to Third Generation Partnership Project (3GPP) User Equipment, the term user equipment/UE is to be understood broadly to cover various mobile/wireless terminal devices, mobile stations and user devices for user communication and/or machine to machine type communication. UE 10 may comprise, for example, a smartphone, a cellular phone, a Machine-to-Machine, M2M, node, Machine-Type Communications, MTC, node, an Internet of Things, IoT, node, a car telemetry unit, a laptop computer, a tablet computer or, indeed, another kind of suitable wireless terminal.

In the example system of FIG. 1, UE 10 may communicate wirelessly with a cell of BS 20 via at least one beam 12 and with BS 22 via beam 14. BS 20 may be considered as a serving BS for UE 10 and the cell of BS 20 may be a serving cell for UE 10. Air interface between UE 10 and BS 20, 22 may be configured in accordance with a radio access technology, RAT, which both UE 10 and BS 20, 22 are configured to support.

Examples of cellular RATs include Long Term Evolution, LTE, New Radio, NR, which may also be known as fifth generation, 5G, radio access technology and MulteFire. For example, in the context of LTE, BS 20 may be referred to as evolved NodeB (eNB) while in the context of NR, BS 20 may be referred to as Next Generation (NG) NodeB (gNB). In any case, embodiments are not restricted to any particular wireless technology. Instead, embodiments may be exploited in any beam-based wireless communication system.

BS 20, 22 may be connected, directly or via at least one intermediate node, with core network 30 via interface 26, such as a NG core network and/or Evolved Packet Core (EPC). The core network 30 may comprise a set of network functions. A network function may refer to an operational and/or physical entity. For example, the element 32 may be a network function or be configured to perform one or more network functions. The network function may be a specific network node or element, or a specific function or set of functions carried out by one or more entities, such as virtual network elements. Examples of such network functions include an access control or management function, mobility management or control function, session management or control function, interworking, data management or storage function, authentication function or a combination of one or more of these functions.

Core network 30 may be, in turn, coupled with another network (not shown), via which connectivity to further networks may be obtained, for example via a worldwide interconnection network. BS 20 may be connected with at least one other BS as well via an inter-base station interface (e.g. by 3GPP X2), or similar NG interface, even though in some embodiments the inter-base station interface may be absent. In some example embodiments, BS 20 may be connected, directly or via at least one intermediate node, with core network 30 or with another core network.

The person skilled in the art will realize that the depicted system is only a simplified example of a part of a system and in practice, and the system may comprise also other nodes or apparatuses, such as physical layer relay nodes or other core network functions or elements, etc. A cellular radio system may be implemented as a multilayer network including several kinds of cells, such as macrocells, microcells and picocells, for example. In some example embodiments, the exemplary network scenario may include a relay instead of, or in addition to, UE 10 and/or BS 20. Relaying may be used for example when operating on millimeter-wave frequencies. Some examples of the relay may be an Integrated Access and Backhaul, IAB, node and an out-band relay.

At least some example embodiments may relate to beam management, and in particular to recovering from beam failure (i.e. loss of beam or deterioration of the beam to a failure detection threshold). In general, beam management may refer to a set of functionalities to assist UE 10 to set its receive, RX, and transmit, TX, beams for downlink receptions and uplink transmissions, respectively. Such a set of functionalities may include, for example, beam indication, beam measurements and reporting, beam recovery and beam tracking and refinement. Beam management may be useful at higher carrier frequencies (such as above 6 GHz). Nevertheless, example embodiments may be applied in any beam-based wireless communication system, regardless of the used carrier frequency.

Multi-TRP operations are being specified for 5G NR. For example, multi-TRP may be used to alleviate intercell interference (ICI) from neighboring base stations via dynamic coordination between the multi-TRPs, to provide joint scheduling and transmissions/receptions. In this way, a wireless device at the cell edge can be served by multi-TRPs to improve its signal transmission/reception resulting in increased throughput. Transmission of multiple control signals via multi-TRPs may be beneficial to improve reliability e.g. of the ultra-reliable low latency communication (uRLLC), vehicle-to-everything (V2X), and high-speed train use cases by providing link diversity gain, especially for the cell edge users.

5G NR uses the Physical Downlink Control Channel (PDCCH) to perform physical layer control functions, such as scheduling downlink (DL) broadcast and DL/uplink (UL) unicast data transmission and signalling triggers for periodic and aperiodic transmission/reception. Downlink control information (DCI) transmitted on the PDCCH provides the UE with the necessary information such as physical layer resource allocation, power control commands, and hybrid automatic repeat request (HARQ) information for both uplink and downlink.

A control resource set (CORESET) is a set of physical (time-frequency) resources and a set of parameters that is used to carry downlink control information, such as a specific region on NR downlink resource grid carrying PDCCH/DCI from BS 20 to UE 10. A CORESET is analogous to the control region in 3GPP Long Term Evolution (LTE), but is generalized in the sense that the set of radio bearers and the set of orthogonal frequency division multiplex (OFDM) symbols in which it is located are configurable with the corresponding PDCCH search spaces. Search space is an area within a CORESET that UE should monitor to detect a specific PDCCH/DCI format. A PDCCH is confined to one CORESET and transmitted with its own demodulation reference signal (DMRS) enabling UE-specific beamforming of the control channel. As an example, a search space configuration associated with a CORESET can be configured with, for example, amonitoringSymbolsWithinSlot (indicative of how many symbols there are in the slot configured for PDCCH monitoring), a monitoringSlotPeriodicityAndOffset (periodicity of the slot and the offset value configured for PDCCH monitoring, and a searchSpaceType (e.g., whether the search space type is common search space (CSS) or UE search space (USS) (i.e., common or user specific)).

In 5G NR the CORESET is localized to a specific region in frequency domain (i.e., not a spread access of the whole channel bandwidth), and a frequency domain parameter defines frequency domain width for a given CORESET. The CORESET may vary in time domain length, which is defined in 5G NR by a radio resource control (RRC) parameter ControlResourceSet duration. In some example embodiments, a CORESET configuration may be in time spans 1-3 consecutive OFDM symbols.

Figure 2:
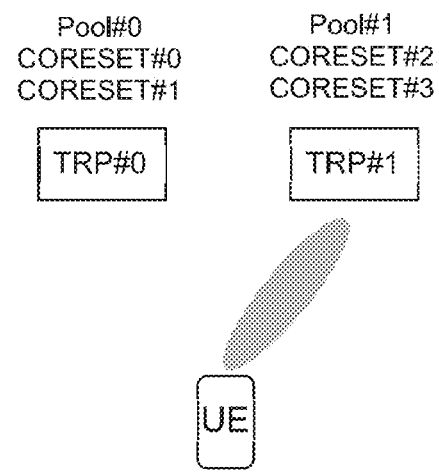
FIG. 2 illustrates an example multiple transmission and reception point (multi-TRP), according to certain example embodiments.

A cell of BS 20, 22 may be a multi-DCI, based multi-TRP (M-TRP) supported cell. M-TRP operations may also be inter-cell M-TRP operations with multi-DCI reception. CORESETs may be grouped in multiple groups, enabling assigning CORESET(s) for different TRPs. For example, FIG. 2 illustrates an example M-TRP scenario in which TRP #0 (which may refer to a TRP that is associated with CORESETs configured with CORESETPoolindex #0) is assigned with CORESETs #0 and #1, and TRP #1 (TRP that is associated with CORESETs configured with CORESETPoolindex #1) is assigned with CORESETs #2 and #3.

In 3GPP NR release 16, for the multi-DCI based M-TRP design, it was decided that the maximum number of configured CORESETs can be up to 5 per downlink bandwidth part (BWP). With one active TCI state per CORESET, the maximum number of active transmission configuration indicator (TCI) states for PDCCH may also be limited to the maximum number of CORESETs per DL BWP.

With multi-TRP operation, a specific higher layer index has been introduced, referred to as CORESETPoolIndex. This index associates each CORESET to a particular TRP or a group or pool of CORESETs that may share specific properties (instead of explicitly indicating the TRP ID): CORESETPoolIndex can be 0 or 1 and may correspond to TRP #0 or TRP #1 (two-TRP case). If no Poolindex is configured, the CORESETPoolindex is assumed 0 corresponding to default TRP #0 (same TRP for all CORESETs). CORESETs within a PDCCH configuration (PDCCH-config) that have the same poolIndex are assumed by the UE to be configured to be provided from the same TRP. In some cases, or examples, regardless of the CORESETPoolIndex value, the CORESETs may or may not be associated with any specific TRP. In some examples, UE simply determines specific actions/procedures to be carried out based on the pool index rather than the association to any TRP.

Embodiments presented herein are not dependent on the way the TRP is identified. For instance, the TRP ID may be present in a CORESET configuration instead, or in addition to, a CORESETPoolIndex. There may be multiple TRPs or CORESETPoolIndexes configured for the UE, such as, for example, more than two of what is currently considered as maximum.

In certain example embodiments, the network, such as BS 20, may configure UE 10 with a set of reference signals (RS) for monitoring a quality of a link (i.e., a quality of a beam). Beam failure detection (BFD) is typically based on configured BFD-RS signals, either implicitly or explicitly, and the set of reference signals may be referred to as $q_0$ or BFD-RSs.

In certain example embodiments, the UE may perform beam failure recovery (BFR) upon detecting beam failure and finding a candidate beam. BFR may be performed by contention free random access (CFRA). CFRA is a two-step procedure which may involve 1) pre-configured PRACH preamble transmission by the UE, where the UE transmits a gNB allocated preamble associated with selected synchronization signal block (SSB) or channel state information-reference signal (CSI-RS), and 2) random access response (RAR) transmission by the gNB when BFR of a cell radio network temporary identifier (C-RNTI) of the UE is performed.

In addition to "normal" CORESETs, applied for operations not related to BFR, a dedicated CORESET may be configured for the UE for (CFRA based) BFR, which may be referred to as CORESET-BFR. In CFRA based BFR, for a gNB response to a BFR request, the UE may monitor the dedicated CORESET-BFR. To configure a CORESET for CFRA based BFR, a CORESET is associated as the CORESET-BFR with dedicated search space for BFR. Upon the association, the CORESET may only be used for monitoring gNB response for CFRA recovery request, i.e. no other search space for other purposes can be mapped to the CORESET defined as CORESET-BFR. The CORESET-BFR may thus refer to a CORESET that is associated with search space configured for beam failure recovery, such as a CORESET associated with the search space set provided by recoverySearchSpaceId information element from the gNB.

Thus, there may be only one CORESET-BFR despite multiple TRPs. The CORESET-BFR is either associated explicitly with (CORESET)PoolIndex to a particular TRP or set to a default TRP #0 (if no CORESETPoolIndex is configured it is assumed to be "0"). This may not be the "correct" TRP, that is, the TRP to which the UE sent the CFRA for BFR and was in failure. Thus, the BFR procedure may fail or may not be carried out in an efficient manner.

With reference to example of FIG. 2, the UE may have sent CFRA to TRP #1, while CORESET-BFR is associated to TRP #0 (either by explicitly configured CORESET-PoolIndex, or as a default association). Further, since TRPs may have specific data scrambling (for physical downlink shared channel (PDSCH)), the UE would not be able to receive any data scheduled by the CORESET-BFR, if it does not assume the CORESET-BFR association correctly.

There is now provided a solution facilitating to improve multi-TRP beam recovery operations, based on dynamically generated control resource set association after detecting a beam failure and/or upon selecting recovery resources based on the failed TRP (or in case full failure where both or all TRPs are in failure).

Figure 3:
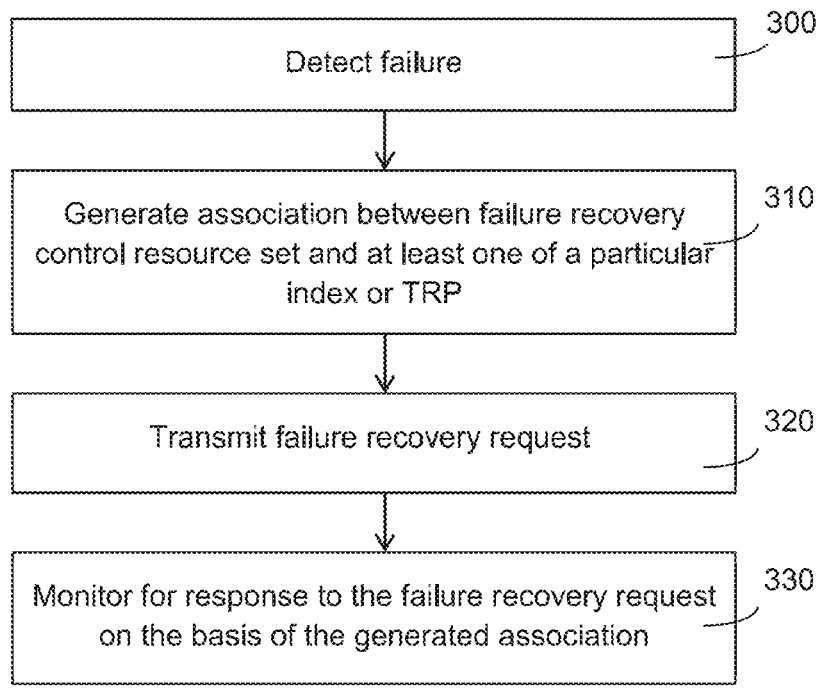
FIG. 3 illustrate an example method, according to certain example embodiments.

FIG. 3 illustrates a method for (radio link resource) failure recovery, according to certain example embodiments. The method may be performed in an apparatus embodied in or including a user equipment or device, such as the UE 10, or a controller thereof.

According to certain example embodiments, the method may include detecting 300 a failure. After detecting the failure, an association between a failure recovery control resource set and at least one of a particular index or a TRP is generated 310. At 320, a failure recovery request is transmitted. At 330, the method may include monitoring for a response to the failure recovery request based on the generated association.

The method of FIG. 3 may be applied for various embodiments including, for example, a failure or failure detection. Failure detection may include detecting a beam failure. Beam failure may correspond to a complete beam failure where all of the beams fail, or to a partial beam failure, where not all of the beams fail. Partial beam failure may in some example embodiments correspond to a TRP failure. Failure or failure detection or beam failure may also refer to failure based on radio link monitoring (RLM). Various example embodiments may include a beam failure, a TRP failure, or failure of beams used for PDCCH transmission or beams (downlink reference signals) configured by network for failure detection (sometimes referred as explicit failure detection resource configuration). Beam failure/failure/radio link failure (based on radio link monitoring) may correspond to a complete failure or full failure where all of the beams fail, or to a partial beam failure, where not all of the beams fail. In some example embodiments, the full or partial failure may occur in intra-cell multi-TRP scenario, inter-cell multi-TRP scenario or simply in multi-TRP scenario. Partial beam failure may in some cases refer to TRP failure. TRP failure may refer to a case where specific beams/downlink reference signals associated with a TRP are determined to be in failure conditions. Failure detection resource (either for beam failure or RLM or in general) may be determined based on the downlink reference signals indicated by the activated TCI states for PDCCH for a respective CORESET(s) As an example, failure or partial failure may be determined for a TRP/CORESETPoolIndex based on the activated TCI states for the CORESET(s) associated with the TRP/CORESET-PoolIndex. In some examples the partial failure may occur or be detected in case of single TRP. TRP (or the CORESETs associated to a TRP) may be referred to the association with CORESETPoolIndex. Below example embodiments referring to beam and/or TRP failure are disclosed, but it is to be appreciated that the below example embodiments may be applied to other failure and/or recovery process, such as, for example, radio link monitoring.

In some embodiments, the failure may include beam failure or a TRP failure, the control resource set may include a beam failure recovery (BFR) control resource set, and the failure recovery request may include a beam failure recovery request (BFRR).

The association generated in block 310 may also be referred to as a dynamic association or dynamically created association. The association may refer to an association being determined dynamically, temporarily, conditionally (e.g. based on selected RACH resource), or instantly upon need, in response to a need to perform BFR procedure. The association of the BFR control resource set may refer to association of at least some of parameters of or associated with the BFR control resource set. The association may be generated after detecting the beam failure, which may be corresponding to a particular index or TRP. The association may be generated based on provided BFR resources, such as CFRA preambles associated with downlink RS.

The association may be generated based on or in response to identifying a new candidate beam for BFR. The association may be generated based on identifying or selecting a TRP (which is associated to identified beam for BFR), to which TRP BFRR will be or has been transmitted. The association may be generated on the basis of CFRA transmission performed for the BFRR. The association generation of block 310 may in some embodiments thus be performed after block 320.

The particular index may generally refer to a predetermined identifier, which may be used to associate a control resource set to a group of control resource sets and/or to a network entity or TRP. In some example embodiments, the (particular) index may be a control resource set pool index, such as the CORESETPoolIndex. In an example embodiment, the particular index may be a TRP ID (or another ID identifying a TRP), CORESETPoolIndex, or another identifier that associates CORESET or CORESETs with a set of transmission assumptions. Examples of such assumptions may include PDSCH scrambling, reception or transmission timing properties or other characteristic, association with a TRP, path loss RS, etc.

In some example embodiments, the BFR control resource set (e.g., a CORESET associated with search space set provided by recoverySearchSpaceId), such as the CORESET-BFR, may be configured to include one or a plurality of search spaces. A particular search space out of the plurality of search spaces may be configured to be monitored on the CORESET for BFR. Monitoring the particular search space (SS) may be based on the generated association (of the SS to a CORESETPoolIndex) that is dynamically/conditionally/temporarily activated or used according to an association of the particular search space to the index (such as CORESETPoolIndex).

The UE may, in block 330, monitor the particular search space within the BFR control resource set. Thus, in some example embodiments, the CORESET for BFR may be associated with one or more search space configurations. A search space configuration may be specific for CORESET-PoolIndex that the CORESET is associated. This allows more flexible network configuration of PDCCH monitoring on the CORESET when the search space configuration can be set to be specific for the TRP that is transmitting it. As a further example, in an inter-cell multi-TRP operation, such configuration option brings benefits, as the SS can be configured per cell basis. In one example embodiment, a CORESET may be associated with one or more search space configurations, wherein the search space configurations may be for BFR purposes. In a further example, a CORESET may be associated with one or more search space IDs configured for BFR.

The BFR control resource set may include one or a plurality of parameter sets per search space and a parameter set is activated or used upon generating the association to the index or the TRP. For example, a recovery search space (search space configured for BFR), may be configured with at least one of CORESETPoolIndex or TRP specific DCI format or formats, aggregation level or levels, or other search space parameters or information elements, such as one or more of monitoringSlotPeriodicityAndOffset, monitoringSymbolsWithinSlot, searchSpaceType, or search space duration in 3GPP NR based systems. The specific configuration may be used when the SS/CORESET is associated with a specific index or a TRP during BFR as described herein. For example, a particular TRP specific parameter set within parameter sets of an SS may be thus activated.

In some example embodiments, the association may include a temporary association based on CFRA and/or a control resource set pool index to which the BFRR is transmitted. CFRA resources (or resource sets) may be further associated with given TRP(s) or CORESETPoolIndex value(s). This enables TRP specific CFRA resources, which may now be applied for BFR, and particularly by the UE to appropriately monitor for the BFR response. Alternatively or additionally, the CFRA resources may be associated with a specific CORESETPoolIndex (value(s)), through candidate beam RS list. This list may be CORESETPoolIndex (TRP) specific or a single list may carry list of RS for one or more TRPs. In one example embodiment, the candidate beam RS list may identify the associated CORESETPoolIndex, or a resource configuration within the list may carry such association. In some cases, both of these options may be possible. In another example embodiment, a resource configuration (such as SSB/non-zero power (NZP)-CSI-RS), that is referred by the candidate beam RS list, may have such information configured.

In one example embodiment, presently disclosed features may be applied (only) when inter-cell multi-TRP is configured. The UE may be configured to determine that it is configured with inter-cell multi-TRP based on, for example, active TCI state for a CORESET. The TCI state (TCI State itself, RS index indicated by the TCI state, or quasi colocation (QCL) source of the RS index) may, thus, refer to a cell which is a non-serving cell or a cell configured to be part of inter-cell multi-TRP. Alternatively, the UE may be configured explicitly that specific CORESET(s) are transmitted from another cell. The inter-cell multi-TRP configuration may be part of a serving cell configuration, such as, for example, the CORESETs are part of serving cell PDCCH config. At least some of the presently disclosed example embodiments may be applied when intra-cell or inter-cell multi-TRP is configured or when these both are configured. Application of the presently disclosed example embodiments is not limited to any particular multi-TRP scenario described herein.

By applying the method, errors or failures in multi-TRP beam failure recovery may be reduced, and the UE may monitor a BFR response from an appropriate TRP. The method may be applied to CFRA BFR in multi-TRP scenario when there is partial failure or full beam failure. Some further example embodiments, with references to 3GPP 5G NR, are illustrated below.

3GPP 5G CORESET-BFR may now be arranged for the UE such that it is not constantly (pre-)associated with PoolIndex set by the gNB, neither with explicitly configured PoolIndex nor with default value "0". The CORESET-BFR may be arranged as a CORESET that is not (pre-) associated with any TRP (i.e., it is not configured by the gNB with a CORESETPoolIndex). Such association of a CORESET particularly for BFR may now be generated directly or indirectly to appropriate TRP dynamically when the UE performs BFR.

However, if a gNB has associated a CORESET (-BFR) with CORESETpoolIndex, in some example embodiments the UE may discard such pre-assigned association for the CORESET-BFR. This discarding may be done when the UE has been configured with multiple or at least two different values of CORESETPoolIndex.

Certain example embodiments may be considered as dynamic indexing. That is, a "floating/dynamic pool index" may be applied specifically to the CORESET-BFR, the association of which may be dynamically established when the UE is performing the CFRA transmission. When the network (gNB) does not associate/configure a CORESET for BFR to any CORESETPoolIndex/TRP, the UE may assume that the association is dynamic for the CORESET. In some cases, when the network explicitly associates or configures a CORESET-BFR with a CORESETTpoolIndex, the UE may assume the specific value for the CORESET and monitor it when it performs failure recovery specific for that TRP (for CORESETs associated with that CORESET-PoolIndex).

In some example embodiments, the UE may be configured with CORESETPoolIndex specific CORESET for BFR (e.g., one CORESET associated with recovery search space id). In one example embodiment, the CORESET for BFR may be specific for a TRP (i.e., there may be a CORESET-BFR for each CORESETPoolIndex). In yet another example embodiment, the CORESET-BFR may be configured in cell (e.g. with physical cell id (PCI)) specific manner when inter-cell multi-TRP is configured. If a CORESET is considered to be cell specific, certain example embodiments may be used to determine failure recovery and CORESET association for TRPs of a given cell.

At least some example embodiments may be applied in response to or based on a condition if the UE is configured by higher layer parameter PDCCH-Config that contains two different values of CORESETPoolIndex in ControlResourceSet, referring that the UE has been configured with multi-TRP operation. The UE may assume multi-TRP operation if the UE is configured by such higher layer parameter PDCCH-Config.

At least some example embodiments may be applied in response to or based on a condition if the UE is configured by higher layer parameter PDCCH-Config that contains at least two or N different values of CORESETPoolIndex in ControlResourceSet, referring that the UE has been configured with multi-TRP operation.

As already indicated, the UE may be configured to dynamically associate (310) the CORESETpoolindex with current BFR and the CORESET-BFR on the basis of CFRA resources or the downlink RS (of a candidate beam). In some example embodiments, the CORESETpoolindex for the CORESET-BFR may be determined temporally based on CFRA transmission in or for block 320.

As an example, the CORESETPoolIndex may be applied for the CORESET-BFR based on the CFRA transmission until the UE has been configured with a new TCI state for a CORESET(s) associated with the failed CORESETPoolIndex. As an another example, the CORESETPoolIndex may be applied for the CORESET-BFR based on the CFRA transmission until the UE has received a DCI format scrambled with C-RNTI/MCS-RNTI (in gNB response) on a recovery search space ID. As an example, the CORESET-PoolIndex may be applied for the CORESET-BFR based on the CFRA transmission until the UE receives configuration for new uplink beam (e.g. an activation command for PUCCH-SpatialRelationInfo), or is provided PUCCH-SpatialRelationInfo for PUCCH resource(s)) for a CORESET(s) associated with a failed CORESETPoolIndex. It is to be noted that these are just some examples of how application of the association may be terminated and may be applied with various options on how the CORESET-BFR is associated to a pool index.

As already mentioned, the CORESET-BFR may be configured with TRP(/CORESETPoolIndex) specific recovery search space configuration. Depending on which TRP the UE 10 transmitted (320) the CFRA for BFR, the UE may define and assume TRP specific search space for block 330 based on association via resources of CFRA preambles and/or the corresponding downlink RS.

For example, the CORESET-BFR may have a configuration for two search spaces. Based on the TRP the UE initiates recovery to, the UE may determine which search space to use in block 330. As an example, a TRP associated with CORESETpoolIndex #0 may have a more dense SS pattern in time while a TRP associated with CORESETpoolIndex #1 may have SS more sparse pattern in time with respect to CORESETpoolIndex #0. SS specific parameters can be adjusted to be TRP/CORESETPoolIndex specific for more flexible operation.

In some embodiments, different search spaces (or any parameters associated to a search space that are CORESET-PoolIndex/TRP specific) may be activated based on the CORESETPoolIndex association in BFR. In an example embodiment, different search spaces (or any parameters associated to a search space (id) that are CORESETPoolIndex/TRP specific) may be activated based on the CORESETPoolIndex association to PCI other than the current serving cell, (i.e., the inter-cell M-TRP scenario).

In some example embodiments, a CORESET (for beam failure recovery or associated with recovery search space ID) may be configured per CORESETPoolIndex. As an example, there may be a TRP specific CORESET for beam failure recovery. The CORESETs may be configured with TRP/CORESETPoolIndex specific parameters (e.g., search space configuration, the CORESET configuration parameters, and other parameters as described herein. In some examples, this configuration may be present when UE is configured with inter-cell or intra-cell multi-TRP.

The CORESET-BFR associated in block 310 may be cell specific in the inter-cell M-TRP: a single cell may have one or more TRPs (e.g., if number of CORESETpoolIndexes is increased and one cell may have multiple TRPs associated with CORESETs).

In some embodiments, CFRA resources and/or candidate beam RSs are grouped on the basis of the particular index, such as the CORESETPoolIndex or another index, which may be associated (310) with the TRP. As an example, TRP identifier may encoded into recovery resource (DL RS) configuration (in candidate beam RS list), into the resource configuration (NZP-CSI-RS, SSB), or in CFRA preamble resource configuration. The candidate beam RS list may be TRP specific, or the individual CFRA resources can be configured to be TRP specific.

Figure 4:
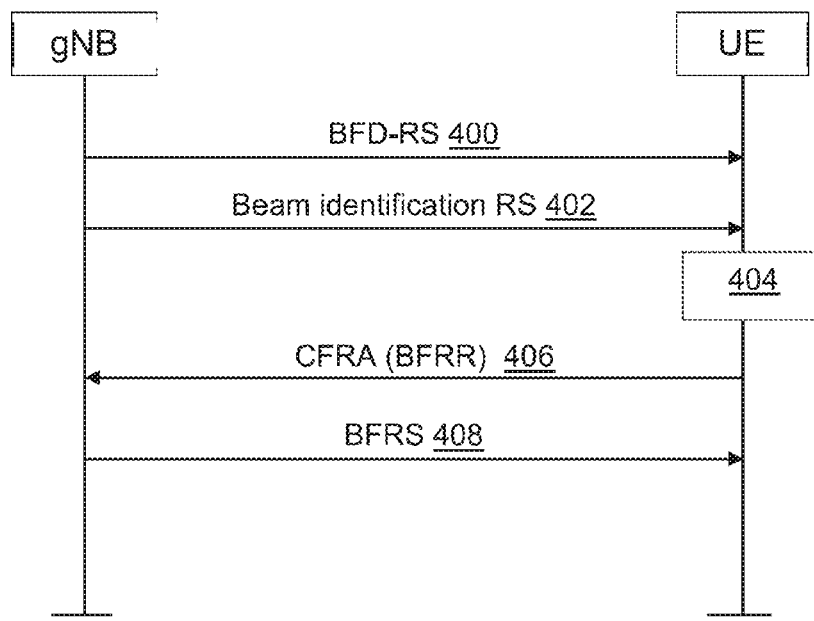
FIG. 4 illustrates an example New Radio (NR) signalling, according to certain example embodiments.

FIG. 4 illustrates an example signalling chart for 5G NR, according to certain example embodiments. As illustrated in FIG. 4, beam failure detection RS 400 may be received by the UE from the gNB.

The UE may generally identify downlink beams by reference signals, such as SSBs, Synchronization Signal/physical broadcast channel (SS/PBCH) block index, or a CSI-RS resource index. The gNB may configure a list of BFD-RSs using RRC signaling for example, or in some cases with combined RRC+Media Access Control, MAC, control element signaling.

If the UE 10 is not explicitly configured with the list of BFD-RSs, UE 10 may determine BFD-RS resources implicitly. For instance, the BFD-RSs may be configured so that the BFD-RSs are Quasi-CoLocated, (QCLed), with PDCCH DMRSs (i.e., the BFD-RSs correspond to downlink beams used to transmit a downlink control channel), such as PDCCH. Thus, BFD-RS resources may be determined based on activated PDCCH TCI states per CORESET.

To determine whether a beam failure instance has occurredall the BFD-RS in the set of $q_0$ are in failure condition (i.e., the hyp. PDCCH block error ratio (BLER) for all the RS in set of q0 are above a threshold level (e.g., 10%)).

The UE may also perform new candidate beam identification, based on beam identification RS(s) 402. The UE may monitor configured SSB, CSI-RS, or a combination thereof to identify new candidate beam(s) with reference signal received power (RSRP) above an associated threshold. After detecting beam failure (and identifying the candidate beam), the UE may generate 404 the association for the CORESET-BFR, by applying at least some of the presently disclosed features, e.g. on the basis of received candidate beam RS 402.

The UE transmits a BFRR, notifying the gNB of the candidate beam(s), by CFRA transmission CFRA (BFRR) 406. In an alternative example embodiment, the UE may generate the association of the CORESET-BFR to a CORESETpoolIndex (associated with the TRP) or explicitly to the TRP after and on the basis of the CFRA transmission 406.

On the basis of the generated association, the UE may configure monitoring of the respective PDCCH CORESET-BFR search space thereof to receive a BFRS 408 from the gNB.

The beam failure in block 300 may be complete or a partial beam failure. The partial beam failure may include a TRP failure. At least some of the presently illustrated features, including the generation 310 of the association, may thus be applied upon selecting recovery resources based on a failed TRP, or in case of full failure where both or all TRPs are in failure.

The BFR request 320, 406 may be of a partial BFR for recovering at least one PDCCH beam associated 310 with at least one control resource set of the particular index, such as the CORESETPoolIndex. The UE may determine the beam failure detection and recovery per TRP based on the (dynamically associated) CORESETPoolIndex, and based on the associated CORESETs.

A partial beam failure may be determined by using individual sets of $g_0$, e.g. $q_{0\_0}$, $q_{0\_1}$ per CORESETPoolIndex. A partial beam failure may be determined when all PDCCH beams associated with CORESETs of a single CORESETpoolIndex are in failure conditions, for at least one instance evaluation period. In one option, the individual CORESETPoolIndex beam failure instance (BFI) counters may be maintained at layer 2 with respective parameters. In one example the CORESETPoolIndexes/TRPs have respective $q_1$ candidate beam sets. As an example, the candidates may be listed in a single list or there may be candidate beam lists per TRP.

The UE may be restricted to perform one partial beam failure at a time. For example, when a partial beam failure is declared, the UE may be allowed to trigger full beam failure.

Below are some further detailed example embodiments on NR link recovery procedures with some references to features defined in 3GPP TS 38.213, par. 6, version 16.1.0.

A UE can be provided, for each bandwidth part (BWP) of a serving cell, a set $\bar{q}_0$ of periodic CSI-RS resource configuration indexes by failureDetectionResources or beamFailureDetectionResourceList and a set $\bar{q}_1$ of periodic CSI-RS resource configuration indexes and/or SS/PBCH block indexes by candidateBeamRSList or candidateBeamResourceList for radio link quality measurements on the BWP of the serving cell.

When the UE is configured with CORESETPoolIndex, the UE may now be provided with a set of $q_1$ associated with CORESETPoolIndex by candidateBeamRSList or candidateBeamResourceList.

For a primary cell (PCell) or a primary secondary cell PSCell, a UE can be provided a CORESET through a link to a search space set provided by recoverySearchSpaceId, as described in 3GPP 38.213, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

In connection with applying at least some of the above illustrated in some example embodiments, the following example alternatives or options may be applied for arranging UE operation, individually or in combination of two or more of the options:

1. When the UE is configured with CORESETPoolIndex, it may assume no index value configured for CORESET associated with recoverySearchSpaceId.
2. When the UE is configured with two (or at least two) different values of CORESETPoolIndex, it may assume no index value configured for CORESET associated with recoverySearchSpaceId.
3. When the UE is configured with CORESETPoolIndex or with two (or at least two) different values of CORESETPoolIndex for a CORESET provided through a link to a search space set provided by recoverySearchSpaceId, the UE may assume no explicit CORESETPoolIndex.
4. For a CORESET provided through a link to a search space set provided by recoverySearchSpaceId, the UE may assume the CORESETPoolIndex determined by the PRACH-ResourceDedicatedBFR. The UE may be configured with CFRA resources specific to a TRP/CORESETPoolIndex and association is determined by the transmitted PRACH resource or the associated downlink RS for the PRACH resource.
5. For a CORESET with a search space set provided by recoverySearchSpaceId, UE assumes the CORESETPoolIndex to be determined by the periodic CSI-RS resource configuration or with SS/PBCH block associated with index $q_{new}$.
6. When the UE is configured with CORESETPoolIndex or with two (or at least two) different values of CORESETPoolIndex and it is provided a CORESET with a recoverySearchSpaceId, it may determine the CORESETPoolIndex for the CORESET with recoverySearchSpaceId based on the indicated downlink RS index for recovery by the PRACH resource (through the association) or through the configuration of the candidate RS index (e.g. based on the association of the RS index to specific TRP/CORESETPoolIndex).
7. When the UE is configured with CORESETPoolIndex or with two (or at least two) different values of CORESETPoolIndex and it is provided a CORESET with a recoverySearchSpaceId, it may assume CORESET with recoverySearchSpaceId for to be associated with each respective CORESETPoolIndex.
8. When the UE is configured with CORESETPoolIndex or with two (or at least two) different values of CORESETPoolIndex, it may be configured explicitly or implicity to determine for which CORESETPoolIndexes the CORESET with CORESET with recoverySearchSpaceId is applicable.

For the PCell or the PSCell, the UE can be provided, by PRACH-ResourceDedicatedBFR, a configuration for PRACH transmission as described in 3GPP 38.213. For PRACH transmission in slot n and according to antenna port quasi co-location parameters associated with periodic CSI-RS resource configuration or with SS/PBCH block associated with index $q_{new}$ provided by higher layers, the UE monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig. For PDCCH monitoring in a search space set provided by recoverySearchSpaceId and for corresponding PDSCH reception, the UE assumes the same antenna port quasi-collocation parameters as the ones associated with index $q_{new}$ until the UE receives by higher layers an activation for a TCI state or any of the parameters tci-StatesPDCCH-ToAddList and/or tci-StatesPDCCH-ToReleaseList. After the UE detects a DCI format with CRC scrambled by C-RNTI or MCS-C-RNTI in the search space set provided by recoverySearchSpaceId, the UE may continue to monitor PDCCH candidates in the search space set provided by recoverySearchSpaceId until the UE receives a MAC CE activation command for a TCI state or tci-StatesPDCCH-ToAddList and/or tci-StatesPDCCH-ToReleaseList.

Example alternatives or options for applying multiple recovery search space IDs per CORESET:
1. When the UE is provided with multiple recovery SearchSpaceIds for a CORESET, the UE may determine the PDCCH monitoring according to the search space set Id associated with CORESETPoolindex determined by the selected PRACH-ResourceDedicatedBFR-resource.
2. When the UE is provided with multiple recovery SearchSpaceIds for a CORESET, the UE may determine the PDCCH monitoring according to the search space set Id associated with CORESETPoolindex.
3. When the UE is provided with multiple recovery SearchSpaceIds for a CORESET, the UE may determine the PDCCH monitoring according to the search space set Id with CORESETPoolindex associated with periodic CSI-RS resource configuration or with SS/PBCH block determined by the PRACH transmission.
4. When the UE is provided with CORESETs with recoverySearchSpaceIds associated with respective CORESETPoolIndex values, the UE may determine the PDCCH monitoring according to the search space set according to the indicated qnew.
5. When the UE is provided with CORESET with recovery SearchSpaceIds associated with respective CORESETPoolIndex values, the UE may determine the PDCCH monitoring for gNB response according to the association with the indicated qnew (either CFRA resource or the associated RS index).

Example alternatives or options for applying multiple PDCCH parameter configurations may include, for example, DCI formats, periodicity etc. (that are specific to a CORESETPoolIndex) within a recovery search space ID of a CORESET:
1. When the UE is provided with multiple configurations within recoverySearchSpaceId for a CORESET, the UE may determine the PDCCH monitoring or PDCCCH monitoring parameters according to the with CORESETPoolindex determined by the selected PRACH-ResourceDedicatedBFR-resource.
2. When the UE is provided with multiple configurations within recoverySearchSpaceId for a CORESET, the UE may determine the PDCCH monitoring or PDCCH monitoring parameters according to the determined CORESETPoolindex.
3. When the UE is provided with multiple configurations within recoverySearchSpaceId for a CORESET, the UE may determine the PDCCH monitoring monitoring or PDCCH monitoring parameters according to the search space set Id with CORESETPoolindex associated with periodic CSI-RS resource configuration or with SS/PBCH block determined by the PRACH transmission.
4. When the UE is provided with CORESETs with recovery SearchSpaceId associated with respective CORESETPoolIndex values, the UE may determine the PDCCH monitoring parameters within a search space according to the indicated qnew. The qnew may be associated with a CORESETPoolIndex by higher layer signaling or configuration.
5. When the UE is provided with CORESET with recovery SearchSpaceId with PDCCH monitoring parameters associated with specific CORESETPoolIndex values, the UE may determine the PDCCH monitoring for gNB response according to the association with the indicated qnew (either CFRA resource or the associated RS index).

For the PCell or the PSCell, after 28 symbols from a last symbol of a first PDCCH reception in a search space set provided by recoverySearchSpaceId for which the UE detects a DCI format with CRC scrambled by C-RNTI or MCS-C-RNTI, and until the UE receives an activation command for PUCCH-SpatialRelationInfo or is provided PUCCH-SpatialRelationInfo for PUCCH resource(s), the UE transmits a PUCCH on a same cell as the PRACH transmission using:

a same spatial filter as for the last PRACH transmission; and a power determined as described in Clause 7.2.1 of 3GPP 38.213, with $q_u=0$, $q_d=q_{new}$, and $l=0$.

For the PCell or the PSCell, after 28 symbols from a last symbol of a first PDCCH reception in a search space set provided by recoverySearchSpaceId where a UE detects a DCI format with CRC scrambled by C-RNTI or MCS-C-RNTI, the UE may assume same antenna port quasi-collocation parameters as the ones associated with index $q_{new}$ for PDCCH monitoring in a CORESET with index 0.

For the PCell or the PSCell, after 28 symbols from a last symbol of a first PDCCH reception in a search space set provided by recoverySearchSpaceId where a UE detects a DCI format with CRC scrambled by C-RNTI or MCS-C-RNTI, the UE may assume same antenna port quasi-collocation parameters as the ones associated with index $q_{new}$ for PDCCH monitoring in a CORESET with index 0.

A UE can be provided, by schedulingRequestIDForBFR, a configuration for PUCCH transmission with a link recovery request (LRR) as described in 3GPP 38.213. The UE can transmit in a first PUSCH at least one MAC CE providing one index for at least one corresponding SCell with radio link quality worse than $Q_{out,LR}$, an index $q_{new}$, for a periodic CSI-RS configuration or for a SS/PBCH block provided by higher layers, as described in 3GPP TS 38.321, if any, for a corresponding SCell. After 28 symbols from a last symbol of a PDCCH reception with a DCI format scheduling a PUSCH transmission with a same HARQ process number as for the transmission of the first PUSCH, and having a toggled NDI field value, the UE may:
monitor PDCCH in all CORESETs on the SCell(s) indicated by the MAC CE using the same antenna port quasi co-location parameters as the ones associated with the corresponding index(es) $q_{new}$, if any; transmit PUCCH on a PUCCH-SCell using a same spatial domain filter as the one corresponding to $q_{new}$, for periodic CSI-RS or SS/PBCH block reception, as described in Clause 9.2.2 of 3GPP 38.213, and using a power determined as described in Clause 7.2.1 of 3GPP 38.213, with $q_u=0$, $q_d=q_{new}$, and $l=0$, if; be provided with PUCCH-SpatialRelationInfo for the PUCCH; a PUCCH with the LRR was either not transmitted or was transmitted on the PCell or the PSCell; and the PUCCH-SCell is included in the SCell(s) indicated by the MAC-CE, where the SCS configuration for the 28 symbols is the smallest of the SCS configurations of the active DL BWP for the PDCCH reception, and of the active DL BWP(s) of the at least one SCell.

Example embodiments of the methods can be related to 3GPP NR radio-technology enhancements. Though, it is noted that any reference to 3GPP/NR elements or information in this application is used as example to describe some example embodiments, and other technologies can also applied.

While some example embodiments have been described in the context of 5G NR-U based systems, it should be thus appreciated that these or other embodiments of the invention may be applicable in connection with other technologies configured to operate on licensed or non-licensed band, such as 6G cellular systems, or other existing or future technologies facilitating beam-based transmissions.

An electronic device including electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device or a vehicle communications unit for vehicle to anything (V2X) communications), a wearable device, or any other apparatus provided with radio communication capability. In another example embodiment, the apparatus carrying out the above-described functionalities may be included in such a device (e.g., the apparatus may comprise a circuitry, such as a chip, a chipset, a microcontroller, or a combination of such circuitries in any one of the above-described devices).

The apparatus may include a communication circuitry providing the apparatus with capability of communicating in at least one wireless network. The communication circuitry may employ a radio interface providing the apparatus with radio communication capability. The radio interface may comprise a radio modem RF circuitries providing at least a part of the physical layer(s) of the wireless device. The radio interface may be included in the apparatus in the embodiments where the apparatus is the wireless device. In other embodiments where the apparatus is a chipset for the wireless device, the radio interface may be external to the apparatus.

The radio interface may support transmission and reception according to the principles described above. The RF circuitries may comprise radio frequency converters and components such as an amplifier, filter, and one or more antennas. The radio modem may include baseband signal processing circuitries such as (de)modulator and encoder/decoder circuitries. The communication circuitry may carry out at least some of the features related to beam failure recovery described above. In embodiments where the apparatus employs multiple physical layer entities, the radio modem and the RF circuitries may employ a separate transmitter and receiver branch for each of the multiple links supported by the apparatus. The radio modem and the RF circuitries may include a dedicated circuitry for the physical layer and another dedicated circuitry for the physical layer, although the dedicated circuitries may employ partially the same physical components in the transmission and/or reception.

Figure 5:
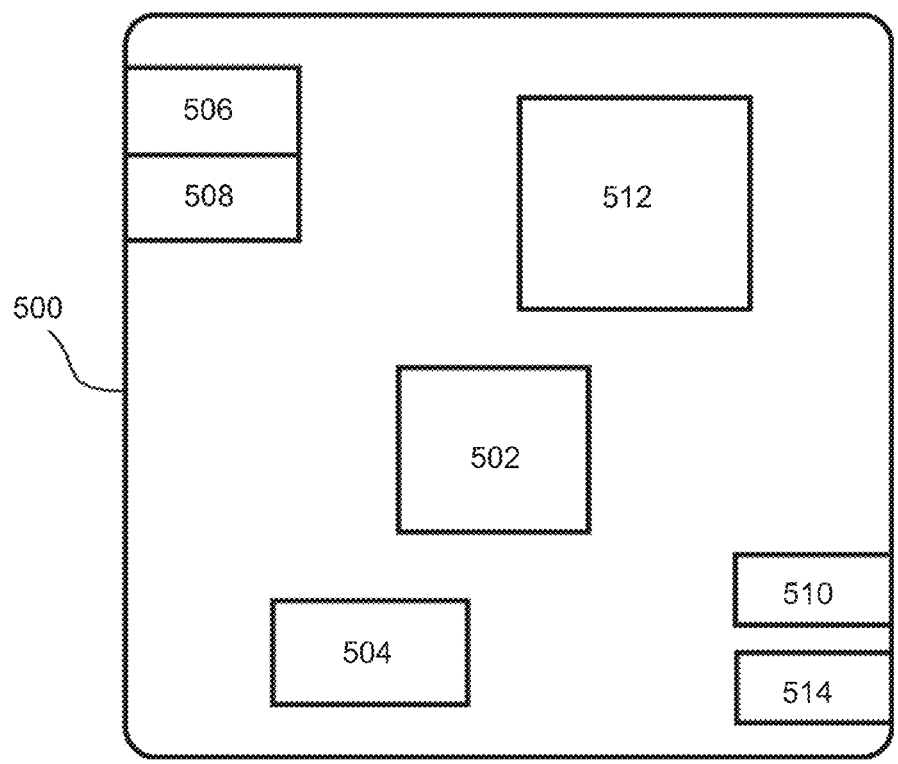
FIG. 5 illustrates an example apparatus capable, according to certain example embodiments.

FIG. 5 illustrates an example apparatus capable of supporting at least some example embodiments of the present invention. Illustrated is a device 500, which may include a communications device arranged to operate as the UE 10, for example. The device may include one or more controllers configured to carry out operations in accordance with at least some of the embodiments illustrated above, such as some or more of the features illustrated above in connection with FIGS. 2 to 4. The device may be configured to operate as the apparatus configured to perform the method of FIG. 3, or embodiments thereof, for example.

Included in the device 500 is a processor 502, which may include, for example, a single- or multi-core processor wherein a single-core processor comprises one processing core and a multi-core processor includes more than one processing core. The processor 502 may include more than one processor. The processor may include at least one application-specific integrated circuit, ASIC. The processor may comprise at least one field-programmable gate array, FPGA. The processor may be means for performing method steps in the device. The processor may be configured, at least in part by computer instructions, to perform actions.

A processor may include circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile user device, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The device 500 may include memory 504. The memory may include random-access memory and/or permanent memory. The memory may include at least one RAM chip. The memory may comprise solid-state, magnetic, optical and/or holographic memory, for example. The memory may be at least in part accessible to the processor 502. The memory may be at least in part comprised in the processor 502. The memory 504 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 500 but accessible to the device. For example, control parameters affecting controlling beam failure recovery related operations illustrated in connection with FIG. 3 may be stored in one or more portions of the memory and used to control operation of the apparatus. Further, the memory may comprise other control parameters, for example.

The device 500 may include a transmitter 506. The device may comprise a receiver 508. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, WLAN, and/or Ethernet standards, for example. The device 500 may comprise a near-field communication, NFC, transceiver 510. The NFC transceiver may support at least one NFC technology, such as NFC, Bluetooth, Wibree or similar technologies.

The device 500 may include a user interface, UI, 512. The UI may comprise at least one of a display, a keyboard, a touchscreen, a vibrator arranged to signal to a user by causing the device to vibrate, a speaker and a microphone. A user may be able to operate the device via the UI, for example to initiate or receive communication sessions via the transmitter 506 and the receiver 508, to operate applications performed in the device, to manage digital files stored in the memory 504 or on a cloud accessible via the transmitter 506 and the receiver 508, or via the NFC transceiver 510, and/or to control operation of the device.

The device 500 may include or be arranged to accept a user identity module or other type of memory module 514. The user identity module may include, for example, a subscriber identity module, SIM, and/or a personal identification IC card installable in the device 500.

The processor 502 may be furnished with a transmitter arranged to output information from the processor, via electrical leads internal to the device 500, to other devices comprised in the device. Such a transmitter may include a serial bus transmitter arranged to, for example, output information via at least one electrical lead to memory 504 for storage therein. Alternatively, to a serial bus, the transmitter may include a parallel bus transmitter. Likewise, the processor may include a receiver arranged to receive information in the processor, via electrical leads internal to the device 500, from other devices included in the device 500. Such a receiver may include a serial bus receiver arranged to, for example, receive information via at least one electrical lead from the receiver 508 for processing in the processor. Alternatively, to a serial bus, the receiver may include a parallel bus receiver.

The device 500 may include further devices not illustrated in FIG. 5. For example, the device may comprise at least one digital camera. Some devices may include a back-facing camera and a front-facing camera. The device may include a fingerprint sensor arranged to authenticate, at least in part, a user of the device. In some embodiments, the device lacks at least one device described above. For example, some devices may lack the NFC transceiver 510 and/or the user identity module 514.

The processor 502, the memory 504, the transmitter 506, the receiver 508, the NFC transceiver 510, the UI 512 and/or the user identity module 514 may be interconnected by electrical leads internal to the device 500 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the embodiments.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof.

In an example embodiment, an apparatus, such as, for example, UE 10, may include means for carrying out the embodiments described above and any combination thereof.

In an example embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an example embodiment, an apparatus, such as, for example, UE 10, may include at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus, comprising:
    at least one processor; and
    at least one memory including computer program code,
    the at least one memory and the computer program code being configured to, with the at least one processor cause the apparatus at least to perform:
        detecting a failure;
        after detecting the failure,
        determining an association in response to identifying a new candidate beam for beam failure recovery, wherein the association is between a control resource set and at least one of a particular index and a beam failure recovery request; and
        transmitting a failure recovery request based on the association.

2. The apparatus of claim 1, wherein the failure comprises beam failure or a transmission or reception point failure, the control resource set comprises a beam failure recovery control resource set, and the failure recovery request comprises a beam failure recovery request.

3. The apparatus of claim 1, wherein the failure recovery request is transmitted by a contention free random access based transmission.

4. The apparatus of claim 1, wherein the generated association comprises a temporary dynamic association based on contention free random access and/or a control resource set pool index to which the failure recovery request is transmitted.

5. The apparatus of claim 1, wherein a particular search space out of a plurality of search spaces is dynamically activated according to an association of the particular search space to the index.

6. The apparatus of claim 2, wherein the beam failure recovery control resource set comprises one or a plurality of parameter sets per search space and a parameter set is activated or used upon generating the association to the particular index or the transmission or reception point.

7. The apparatus of claim 1, wherein the at least one memory and the computer program code being further configured to, with the at least one processor cause the apparatus at least to perform:
    monitoring for a response to the failure recovery request based on the generated association.

8. The apparatus of claim 1, wherein the control resource set comprises a coreset-bfr and the particular index is comprises a coresetpoolindex.

9. The apparatus of claim 1, wherein the association is generated on the basis of received candidate beam reference signal.

10. The apparatus of claim 1, wherein the association is generated on the basis of the transmission or reception point, which is associated with a candidate beam identified for beam failure recovery, and the monitoring comprises monitoring for a response from the transmission or reception point indicted by the association.

11. The apparatus of claim 1, wherein the failure comprises a complete beam failure or a partial beam failure.

12. The apparatus of claim 11, wherein the failure recovery request comprises a complete beam failure recovery request or a partial beam failure recovery request.

13. The apparatus of claim 1, wherein the failure recovery request is configured to recover at least one physical downlink control channel beam associated with at least one control resource set of a control resource set pool index.

14. The apparatus of claim 1, wherein at least one of contention free random access resources or candidate beam reference signals are grouped on the basis of the index which is associated with the transmission or reception point.

15. The apparatus of claim 1, wherein the at least one processor, at least one memory including computer program code, the at least one memory and the computer program code are further configured to cause the apparatus at least to perform:
    discarding a preconfigured index for the failure recovery control resource set and instead apply the index of the generated association.

16. The apparatus of claim 1, wherein the at least one processor, at least one memory including computer program code, the at least one memory and the computer program code are further configured to cause the apparatus at least to perform:
    applying the index until new transmission configuration indicator state is configured.

17. The apparatus of claim 1, wherein the apparatus comprises a user equipment.

18. The apparatus of claim 7, wherein the monitoring comprises monitoring a particular search space within the beam failure recovery control resource set.

19. The apparatus of claim 11, wherein the partial beam failure is determined when all physical downlink control channel beams associated with control resource sets of a single coresetpoolindex are in failure conditions.

20. The apparatus of claim 11, wherein the partial beam failure comprises a transmission or reception point failure.

* * * * *